United States Patent

[11] 3,622,814

| [72] | Inventor | Thomas E. Carlson<br>Hopkins, Minn. |
|---|---|---|
| [21] | Appl. No. | 56,022 |
| [22] | Filed | June 22, 1970 |
| [45] | Patented | Nov. 23, 1971 |
| [73] | Assignee | The United States of America as represented by the Secretary of the Navy |

[54] NEGATIVELY CHARGING PIEZOELECTRIC POWER SUPPLY
4 Claims, 3 Drawing Figs.

[52] U.S. Cl..................................................... 310/8.4,
102/70.2 G, 310/8.7
[51] Int. Cl..................................................... H01v 7/00
[50] Field of Search............................................ 310/8.4,
8.7, 8.1, 8.3; 102/70.2, 70.2 G, 70.2 GA

[56] References Cited
UNITED STATES PATENTS

| 3,098,163 | 7/1963 | Bliss | 310/8.4 |
| 2,853,012 | 9/1958 | Rotkin et al. | 102/70.2 |
| 3,324,317 | 6/1967 | Hazelet | 310/8.4 |
| 3,269,175 | 8/1966 | Sprosty | 310/8.7 X |
| 3,349,709 | 10/1967 | Vilbajo | 310/8.7 X |

Primary Examiner—D. X. Sliney
Assistant Examiner—B. A. Reynolds
Attorneys—R. S. Sciascia and Roy Miller ABSTRACT: A negatively charging piezoelectric power supply including a case, piezoelectric crystal, set back weight, probe switch and rubber disk such that on accelerating the projectile containing the piezoelectric power supply, the probe shorts the charge generated by the crystal to the case through compressing the rubber disk by the weight and on lessening of the acceleration the short is removed and a negative charge produced by the crystal relaxation.

PATENTED NOV 23 1971 3,622,814

INVENTOR.
THOMAS E. CARLSON

BY
ROY MILLER
ATTORNEY.

NEGATIVELY CHARGING PIEZOELECTRIC POWER SUPPLY

BACKGROUND OF THE INVENTION

1. Field of the Invention

Missile and projectiles usually use electrical energy to cause detonation. Ordinarily the electrical energy is supplied by a battery and a separate circuit is employed for applying energy from the battery to the detonator train at the proper time. In such devices, means are always provided to permit the projectile or missile to remain in a safe unarmed condition until time for arming. Simplicity of the arming and detonator systems for projectiles and missiles and to improvements to reliability thereof are prime requirements.

2. Description of the Prior Art

U.S. Pat. No. 3,098,163 and U.S. Pat. No. 3,324,317 describe inertial energy generator storage systems wherein a set back weight or inertial mass acts on a piezoelectric crystal to produce a voltage which is used to actuate a detonator train. The systems act in such a fashion that the piezoelectric crystal is initially shorted out under acceleration forces and as the acceleration force decreases a negative charge is produced which is used to actuate the detonator train.

DESCRIPTION OF THE PREFERRED EMBODIMENT

Figure 1:
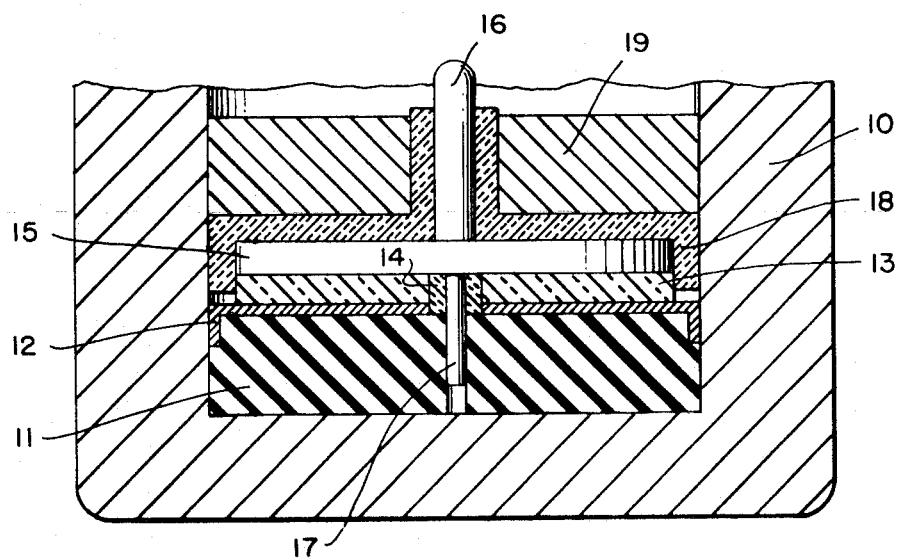
FIG. 1 is a cross section of the energy storage system.

The negatively charging piezoelectric power supply depends on the reversibility of the piezoelectric effect to maintain a voltage in the absence of a maintaining pressure. Thus, in FIG. 1, a metal case 10 comprising a projectile casing contains a rubber disk 11 having a hole therethrough abutting the base portion of the casing. The rubber disk, is in turn, covered by a metal contact cup 12. Metal contact cup 12 has a hole through the central portion thereof and abutting the cup is a piezoelectric crystal 13. Piezoelectric crystal 13 also has a hole therethrough and an insulator 14 is provided (fitting in the hole), the length of which is equal to the thickness of the metal contact cup 12 and the piezoelectric crystal 13.

Abutting the upper face of the piezoelectric crystal 13 is a metal contact plate 15 which comprises a portion of the probe switch. The metal contact plate has extending upwardly therefrom a portion 16 and a downwardly extending portion 17. The upwardly extending portion 16 is adapted to contact a penetrator rod (not shown) which is carried in the body of the projectile. The downwardly extending portion 17 is adapted to contact the base of the casing 10 at peak acceleration and therefore is of such a length that upon peak acceleration the rod 17 will contact the casing and the piezoelectric crystal will be shorted to the case.

An insulator 18 is provided between the piezoelectric crystal and the metal contact plate 15 and the inner surface of the casing 10. The insulator 18 extends upwardly around the upwardly extending member 16. A set back weight 19 is carried in the space between the inner surface of the casing 10 and the insulator 18 in contact with the casing 10.

Figure 2A:
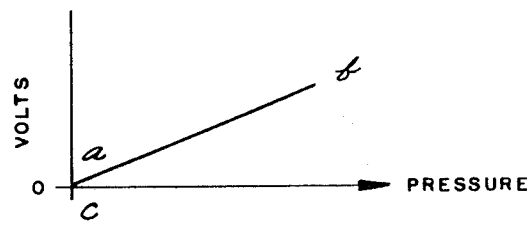
FIG. 2 (a) is a graph illustrating normal piezoelectric action.
FIG. 2B illustrates the voltage curve attained by the present invention.
Figure 2B:
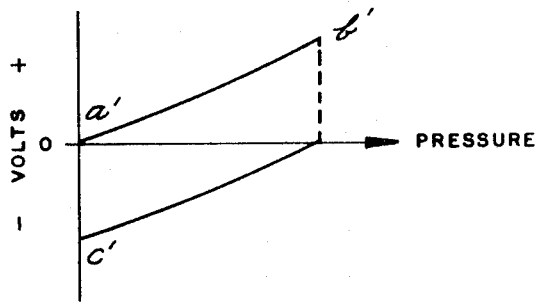

In operation, when a projectile is launched, pressure is applied to the piezoelectric crystal 13 thereby causing a voltage to be developed across the electrode surface of the crystal. As peak acceleration is reached and pressure is relaxed the voltage returns to zero. See FIG. 2A and the line diagram $a,b,c$. If the electrodes of the crystal were shorted at peak pressure, then unshorted as the pressure is relaxed, the voltage across the crystal would appear as in FIG. 2B. That is, the voltage curve would be from $a'$ to $b'$ to zero and then to $c'$.

The power supply shown in FIG. 1 is designed to be actuated by the rapid acceleration as encountered by a gun-fired projectile. Under acceleration force, the mass of the setback weight 19 applies pressure to the piezoelectric crystal 13 and compresses the rubber disk 11 until the probe switch 17 makes contact with the metal case 10 and shorts the electrode faces of the crystal. As acceleration decreases the rubber disk expands, allowing the probe switch 17 to break contact with the casing 10 thereby allowing the piezoelectric crystal 13 to develop a negative voltage across its electrode faces.

What is claimed is:

1. An inertial energy generator-storage device for a projectile comprising;

a casing formed of a conducting material having a base portion;

a resilient member having a hole therethrough contained within said casing and having one of its surfaces abutting said base;

a conducting contact member also having a hole therethrough abutting another of the surfaces of said resilient member and contacting said casing;

a piezoelectric crystal having a hole therethrough and abutting said conducting contact member;

a probe switch mounted in abutting relationship with the piezoelectric crystal and having an extending portion adapted to pass through the holes in the resilient member, contact member and piezoelectric crystal and of such a length that under zero acceleration conditions the extending portion does not contact the base portion; and inertial mass means acting on said probe switch such that when said projectile is launched the mass causes the probe switch to contact said base member at peak pressure by compressing said resilient means and thereby shorting said piezoelectric crystal to said casing and as acceleration decreases the resilient means is allowed to expand thereby causing the probe switch to break contact thereby allowing the crystal to develop a negative voltage.

2. An inertial energy generator-storage system as set forth in claim 1 wherein;

said inertial mass means comprises a metallic setback weight shaped to conform to the inner dimensions of said casing.

3. An inertial energy generator-storage system as set forth in claim 2 and further including insulator means interspersed between said inertial mass means and the probe switch.

4. An inertial energy generator-storage system as set forth in claim 3 wherein;

said insulator means is shaped to conform to the inner dimension of said casing and extends around said casing on the inside thereof in such a manner as to insulate said probe switch and piezoelectric crystal from said casing.

* * * * *